March 25, 1924.
C. CRITHARIS
1,488,098
AUTOMOBILE LICENSE PLATE HOLDER
Filed May 21, 1923
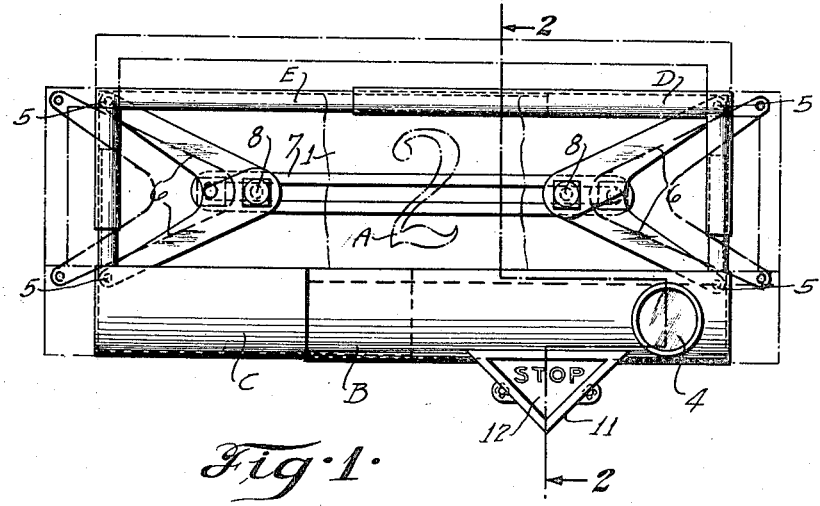
Fig. 1.
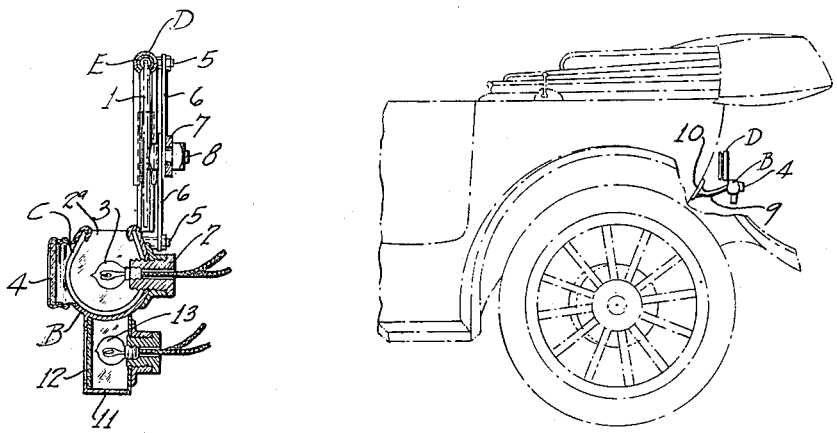
Fig. 2.
Fig. 3.
INVENTOR
Constantinos Critharis.
By Ralph Kalish
ATTORNEYS Patented Mar. 25, 1924.

1,488,098

UNITED STATES PATENT OFFICE.

CONSTANTINOS CRITHARIS, OF ST. LOUIS, MISSOURI.

AUTOMOBILE LICENSE-PLATE HOLDER.

Application filed May 21, 1923. Serial No. 640,444.

*To all whom it may concern:*

Be it known that I, CONSTANTINOS CRITHARIS, a subject of the King of Greece, residing at the city of St. Louis, State of Missouri, have invented a certain new and useful Improvement in Automobile License-Plate Holders, of which the following is a specification, reference being had to the accompanying drawings, forming a part thereof.

My invention relates to improvements in license plate-holders for automobiles, and the primary objects of my invention are to provide a holder comprising elements or members forming a frame in which the plate may be secured and supported upon the automobile without the employment, as is generally common today, of screws, rivets, or the like devices extended through the plate; to provide simple means whereby the frame may be readily adapted to fit and support license-plates of varying dimensions, and to provide simple means whereby the holder may be mounted upon the automobile.

A further object of my invention is to provide one of the frame elements or members with a lamp for the illumination of the held license-plate, and to provide means whereby such lamp may serve as a "tail-light."

And a still further object of my invention is to provide a housing, carried by one of the frame elements or members, for a lamp, and to associate with such lamp simple traffic signalling means.

With the above and other objects in view, my present invention resides in the novel features of form, construction, arrangement, and combination of parts hereinafter described and afterwards pointed out in the claims.

In the accompanying drawing,

Figure 1 is a rear elevational view of a license-plate holder embodying my invention, a fragment of a license-plate being shown and the holder being extended or adjusted both in length and height to fit the particular license-plate;

Figure 2 is a transverse sectional view of the holder taken approximately on the line 2—2, Figure 1; and Figure 3 shows a holder of my invention in side elevation as related to an automobile shown fragmentarily in dotted lines.

Referring now more in detail and by reference characters to the said drawing, which illustrates a preferred embodiment of my invention, 1 designates a license plate, shown only by dotted lines, which is of common construction, that is, ordinarily, a metallic plate of rectangular oblong shape and bearing indicia, such as the numeral shown at A.

The various States (licensors) issue plates whose height and width dimensions vary; hence there is requirement for a holding means which may be adjustably expanded or contracted to the various plate-dimensions. To this end, I provide a holder composed of elements or members which are relatively movable or shiftable and in which the plate is framed, after the fashion of a picture frame, so that the margins of the plate are obscured.

The holder proper comprises, preferably and as shown, four substantially L-shaped members B, C, D, and E, each of which is of open-seam tubular construction and arranged for telescopic relative fitment. By further preference, the lower or longitudinal portions of the members B and C are of relatively greater sectional dimensions than, and are rearwardly offset from, the members D and E, as best seen in Figure 2, and extended through one of the rear walls of one of the members B or C is a socket 2 for an electric lamp 3, the member B or C, as the case may be, having an opening 2ª adjacent the lamp 3, whereby the plate 1 may be illuminated. In the opposite wall of the member B or C having the socket 2 and lamp 3, is a glazed opening 4, whereby the lamp 3 may also serve as a "tail-light."

Projecting forwardly from the members B, C, D and E, are threaded pins 5, and pivotally connected with each pin is an angular arm 6, which extend to and are pivotally connected, as by means of bolts 8 or their equivalent, with a slotted-bar 7.

Obviously, and as shown by dotted lines, the holder members may be relatively shifted to form license-plate frames of varying height and length dimensions, and the arms 6, bar 7, and bolts 8 adjusted and set to hold the members in their various set or adjusted positions.

Secured to one of the members of the holder and projecting forwardly therefrom, is an arm 9 having a foot 10 for attachment to a part of the automobile, as shown in Figure 3.

Depending from one of the members B or C is a housing 11 having a glazed opening 12 and a lamp 13, which may be employed as a traffic signal.

I am aware that minor changes in the form, construction, arrangement, and combination of the several parts of my new license-plate holder may be made and substituted for those herein shown and described without departing from the nature and principle of my invention.

Having thus described my invention, what I claim and desire to secure by Letters Patent is:

1. A license-plate holder comprising a frame composed of a plurality of telescopically shiftable members for adjustably supporting license-plates of varying dimensions, in combination with means for releasably locking the frame-members in adjusted shifted positions, said means including a slotted bar disposed longitudinally of the frame and pairs of arms having sliding and pivoted connection with the bar and pivoted connection at their ends with the frame members.

2. A license-plate holder comprising a frame composed of a plurality of telescopically shiftable members of open-seam tubular form adapted to adjustably support license-plates of varying dimensions, in combination with means for releasably locking the frame-members in adjusted shifted positions, said means including a longitudinally slotted bar disposed longitudinally of the frame, and pairs of arms having slot and bolt connection with the bar and pivoted connection at their ends with the frame members.

3. A license-plate holder including a frame composed of a plurality of relatively shiftable members for adjustably supporting license plates of varying dimensions, and means including a bar disposed longitudinally of the frame and pairs of arms having connection at their ends with the bar and with the frame members for releasably locking the frame members in adjusted shifted positions, in combination with means supported by one of the frame members for illuminating the particular supported license plate.

In testimony whereof, I have signed my name to this specification.

CONSTANTINOS CRITHARIS.